Aug. 3, 1937. S. J. SHARP 2,089,074
SHAPER ATTACHMENT
Filed Aug. 18, 1936 2 Sheets-Sheet 1

WITNESSES
INVENTOR.
Samuel J. Sharp
BY
Munn, Anderson & Liddy.
ATTORNEYS.

Aug. 3, 1937.  S. J. SHARP  2,089,074
SHAPER ATTACHMENT
Filed Aug. 18, 1936  2 Sheets-Sheet 2

WITNESSES

INVENTOR.
Samuel J. Sharp
BY
ATTORNEYS.

Patented Aug. 3, 1937

2,089,074

UNITED STATES PATENT OFFICE 2,089,074

SHAPER ATTACHMENT

Samuel J. Sharp, Warwood, Wheeling, W. Va.

Application August 18, 1936, Serial No. 96,565

4 Claims. (Cl. 144—1)

This invention relates to shaper attachments and more particularly to a shaper attachment designed for use in combination with and constituting a fixed part of a jig saw. In other words, my improved attachment is especially designed for jig saws, giving to the owner of the machine a wide range of utility in the use of saws and in the use of shapers.

A further object is to provide an attachment of this character which can be conveniently attached to a jig saw and which will not in any way interfere with the operation of the jig saw.

With these and other objects in view, the invention consists in certain novel features of construction and combinations and arrangements of parts, all of which will be more fully hereinafter described and pointed out in the claims.

In the accompanying drawings—

Figure 1:
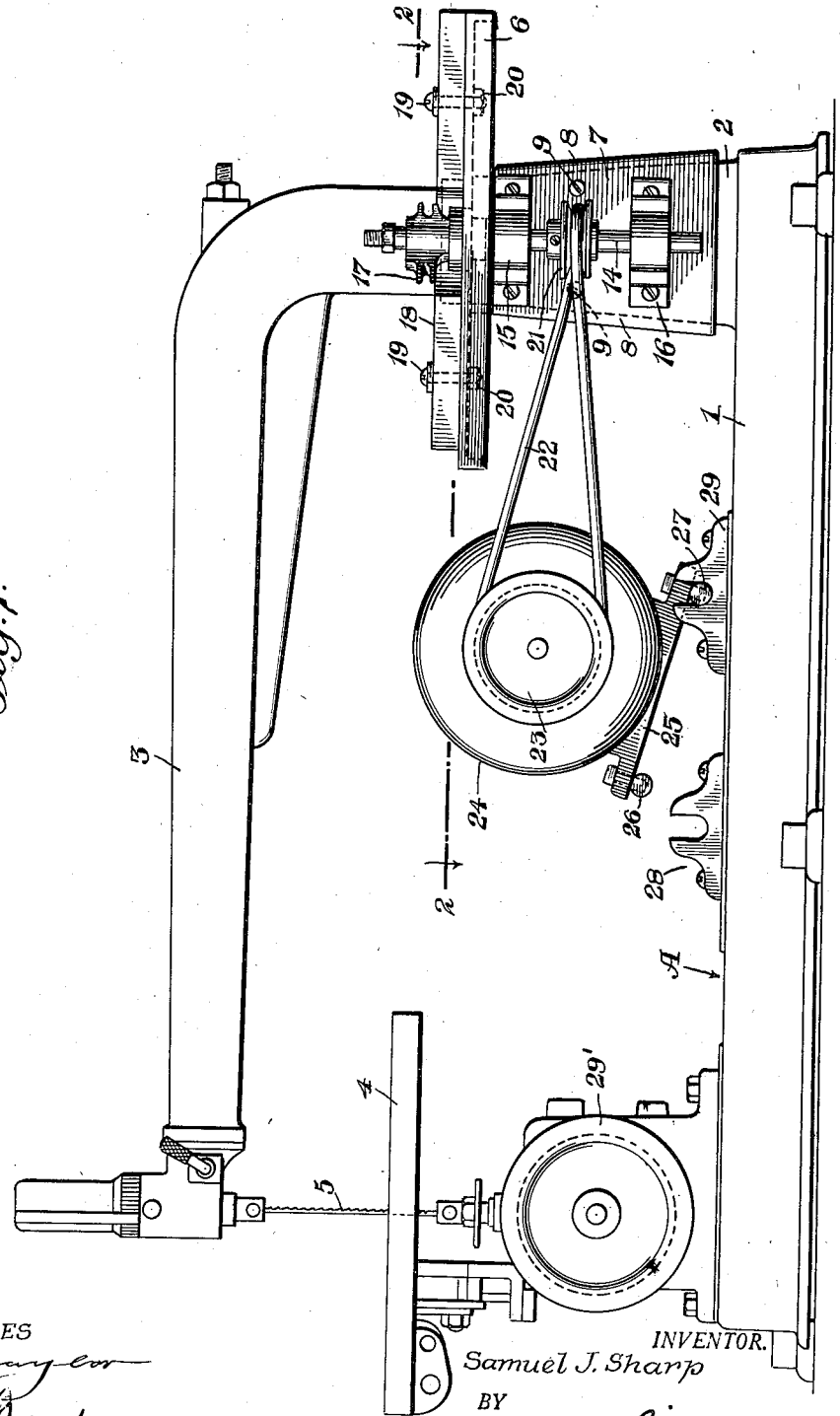
Figure 1 is a view in side elevation illustrating my invention attached to a standard type of jig saw.
Figure 2:
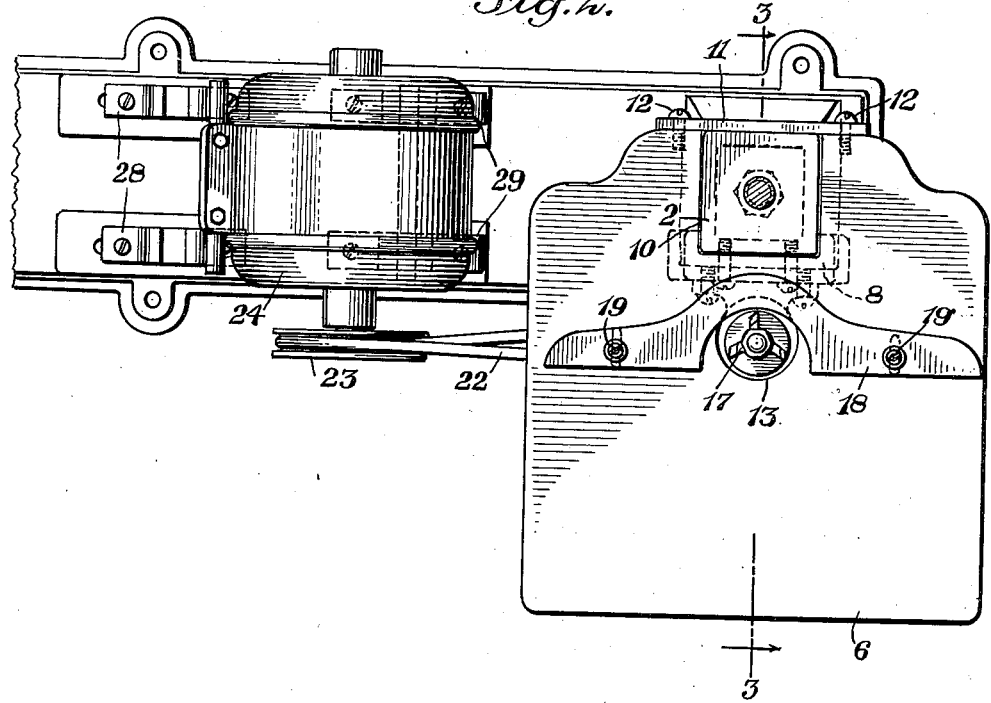
Fig. 2 is a sectional plan view on the line 2—2 of Fig. 1.
Figure 3:
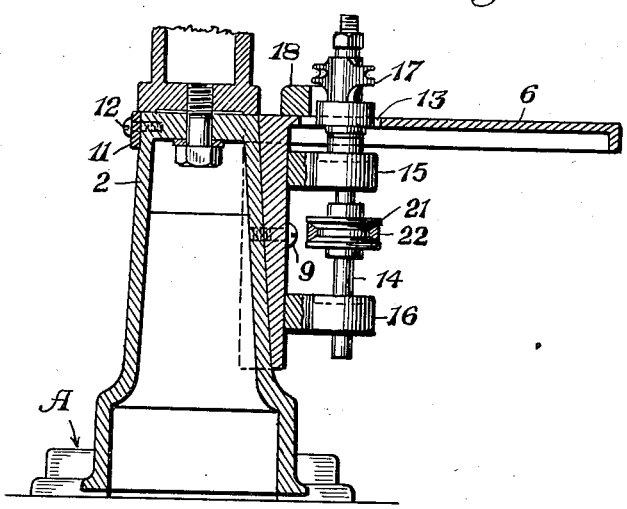
Fig. 3 is a view in transverse section on the line 3—3 of Fig. 2.

The jig saw indicated generally by the reference character A has the usual base or bed 1 with an upright or standard 2 thereon to which the ordinary head carrying arm 3 is fixedly secured. 4 indicates the table of the jig saw, which is supported in any approved manner and through which a saw 5 reciprocates.

My improved attachment includes a work-supporting table 6, which is integral with a vertically positioned bracket 7. This bracket 7 is shaped to fit the upright or standard 2, and it is of course to be understood that for various types of jig saws there are various shapes of upright and the bracket 7 will correspond in general outline thereto. This bracket 7 is formed at its edges with flanges 8 which engage opposite faces of the upright, and screws 9 may be projected through the bracket and screwed into the upright. The table 6 is formed with a recess 10 to accommodate the upright 2 therein, and a cross bar 11 is located back of the upright and secured to the table 6 by means of screws 12. The table 6 has an opening 13 therein through which a shaft 14 projects, and this shaft 14 is mounted in a pair of bearing brackets 15 and 16 secured to the bracket 7, and at its upper end is adapted to receive any suitable form, arrangement and combination of cutting tool, indicated generally by the reference character 17. An adjustable work guide 18 is secured to the table 6 by screws 19 and nuts 20 and the position of this guide may be adjusted in accordance with the work being done. A pulley 21 is secured on the shaft 14 and this pulley 21 is driven by an endless belt 22 which in turn is passed around a drive pulley 23 on an electric motor 24. The base 25 of this electric motor is provided with two transversely-extending fulcruming rods 26 and 27 and recessed brackets 28 and 29 are secured to the base 1 and receive the fulcruming rods therein. When the motor is in position to drive the pulley 21 and the shaping tool 17, fulcruming rod 27 is in the bracket 29 while the other fulcruming rod 26 is in elevation, so that the weight of the electric motor operates to always maintain a proper drive between the pulleys and belt, in other words takes up any slack. When the motor is used to operate the jig saw its fulcruming rod 26 is located in the bracket 28 and a second belt (not shown) is used to connect the pulley belt 22 with a pulley 29' on the jig saw.

It will be noted, particularly by reference to Fig. 1 of the drawings, that the work table 6 of the shaper constituting my improved attachment, is in a lower plane than the work table 4 of the jig saw. Thus the work on the jig saw regardless of its length is not interfered with by the table 6 of the shaper attachment.

While I have illustrated and described what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. The combination with a jig saw having a base and an upright thereon, of an attachment for the jig saw, including a work-supporting table having a recess in one end receiving the upright, a bar back of the upright and secured at its ends to the edge of the table, an integral bracket depending from the table, means securing the bracket to the upright, and a shaft projecting through the table and adapted to receive a shaping tool thereon.

2. The combination with a jig saw having a base and an upright thereon, of an attachment for the jig saw including a work-supporting table having a recess in one end receiving the upright, a bar back of the upright and secured at its ends to the edge of the table, an integral bracket depending from the table, flanges at the edges of the bracket receiving the upright between them, means securing the bracket to the upright, and a shaft projecting through the table and adapted to receive a shaping tool thereon.

3. The combination with a jig saw having a base and an upright thereon, of an attachment for the jig saw including a work-supporting table having a recess in one end receiving the upright, a bar back of the upright and secured at its ends to the edge of the table, an integral bracket depending from the table, flanges at the edges of the bracket receiving the upright between them, means securing the bracket to the upright, a shaft projecting through the table and adapted to receive a shaping tool thereon, bearing brackets secured to the first-mentioned bracket and providing mounting for the shaft, and a pulley on said shaft.

4. The combination with a jig saw having a base and an upright thereon, of an attachment for the jig saw including a work-supporting table having a recess in one end receiving the upright, a bar back of the upright and secured at its ends to the edge of the table, an integral bracket depending from the table, flanges at the edges of the bracket receiving the upright between them, means securing the bracket to the upright, a shaft projecting through the table and adapted to receive a shaping tool thereon, bearing brackets secured to the first-mentioned bracket and providing mounting for the shaft, a pulley on said shaft located between the bearing brackets, a motor supported on the base, and means transmitting motion from the motor to said pulley.

SAMUEL J. SHARP.